United States Patent
Griffin, Jr. et al.

(10) Patent No.: US 9,145,904 B2
(45) Date of Patent: Sep. 29, 2015

(54) PILOT OPERATED FLUID REGULATORS HAVING A RESET APPARATUS AND RELATED METHODS

(75) Inventors: James Lyman Griffin, Jr., McKinney, TX (US); Daniel Gunder Roper, Lucas, TX (US); Douglas James Scheffler, McKinney, TX (US); Harold Joe McKinney, Durant, OK (US); Jason Daniel Journey, Fairview, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 791 days.

(21) Appl. No.: 13/275,055

(22) Filed: Oct. 17, 2011

(65) Prior Publication Data

US 2013/0092259 A1 Apr. 18, 2013

(51) Int. Cl.
F15B 11/08 (2006.01)
G05D 16/16 (2006.01)
G05D 16/20 (2006.01)

(52) U.S. Cl.
CPC ............. *F15B 11/08* (2013.01); *G05D 16/163* (2013.01); *G05D 16/2086* (2013.01); *F15B 2211/30565* (2013.01); *Y10T 137/7758* (2015.04); *Y10T 137/7761* (2015.04)

(58) Field of Classification Search
CPC ................... F15B 11/08; F15B 2211/30565
USPC ....................................... 137/187, 487.5, 488
See application file for complete search history.

(56) References Cited

U.S. PATENT DOCUMENTS

| | | | | |
|---|---|---|---|---|
| 3,706,320 | A * | 12/1972 | Kalsi | 137/487 |
| 4,961,441 | A * | 10/1990 | Salter | 137/487.5 |
| 5,047,965 | A * | 9/1991 | Zlokovitz | 137/487 |
| 5,586,575 | A * | 12/1996 | Bergamini et al. | 137/488 |
| 5,651,385 | A * | 7/1997 | Karte | 137/487.5 |
| 6,568,416 | B2 * | 5/2003 | Tucker et al. | 137/487.5 |
| 6,584,999 | B2 * | 7/2003 | Inayama et al. | 137/487.5 |
| 7,556,238 | B2 * | 7/2009 | Seberger | 251/129.04 |
| 2011/0180160 | A1 | 7/2011 | Froehlich et al. | |

FOREIGN PATENT DOCUMENTS

| | | |
|---|---|---|
| EP | 0822344 A2 | 2/1998 |
| EP | 2258952 A2 | 12/2010 |

OTHER PUBLICATIONS

"Elektropneumatischer Stellungsregler SIPART PS, Siemens Katalog MP31", Siemens Katalog MP31, XX, XX, Jan. 1, 1996, pp. 8/02-8/08, XP002090433. (7 pages).

(Continued)

*Primary Examiner* — Eric Keasel
(74) *Attorney, Agent, or Firm* — Hanley, Flight & Zimmerman, LLC

(57) ABSTRACT

Fluid regulator systems having reset apparatus and methods are described herein. An example reset apparatus for use with a fluid regulator system includes a first valve having an inlet to receive a loading fluid and an outlet in fluid communication with a loading chamber of a fluid regulator, and a second valve having an inlet in fluid communication with the loading chamber of the fluid regulator and an outlet in fluid communication with a vent.

17 Claims, 9 Drawing Sheets

(56) References Cited

OTHER PUBLICATIONS

International Searching Authority, "International Search Report", issued in connection with International Patent Application No. PCT/US2012/060005, mailed Apr. 5, 2013. (2 pages).

International Searching Authority, "Written Opinion", issued in connection with International Patent Application No. PCT/US2012/060005, mailed Apr. 5, 2013. (7 pages).

Fisher, "FL Series Pressure Reducing Regulators," Bulletin 71:2:FL, Sep. 2002, 8 pages.

Tartarini, "Type PRX/120, PRX/125, PRX-AP/120, PRX-AP/125, PRX/181, PRX/182, PRX/131 and PRX-AP/131 Pilots," Instruction Manual, Jul. 2008, 8 pages.

Fisher, "EZH and EZHSO Series Pressure Reducing Regulators," Bulletin 71.2:EZH and EZHSO, Jul. 2011, 28 pages.

* cited by examiner

PILOT OPERATED FLUID REGULATORS HAVING A RESET APPARATUS AND RELATED METHODS

FIELD OF THE DISCLOSURE

The present disclosure relates generally to fluid regulators and, more particularly, to pilot operated fluid regulator systems having a reset apparatus and related methods.

BACKGROUND

Fluid valves and regulators are commonly distributed throughout process control systems to control the flow rates and/or pressures of various fluids (e.g., liquids, gasses, etc.). In particular, a fluid regulator is typically used to reduce the pressure of a fluid and regulate the pressure to a substantially constant value. Specifically, a fluid regulator has an inlet that typically receives a fluid at a relatively high pressure and provides a relatively lower pressure at an outlet. The inlet pressure is reduced to a lower outlet pressure by restricting flow through an orifice to match the fluctuating downstream demand. For example, a gas regulator associated with a piece of equipment (e.g., a boiler) may receive a gas having a relatively high and somewhat variable pressure from a gas distribution source and may regulate the gas to have a lower, substantially constant pressure suitable for safe, efficient use by the equipment.

SUMMARY

In one example, an example reset apparatus for use with a fluid regulator system includes a first valve having an inlet to receive a loading fluid and an outlet in fluid communication with a loading chamber of a fluid regulator, and a second valve having an inlet in fluid communication with the loading chamber of the fluid regulator and an outlet in fluid communication with a vent.

In another example, a reset apparatus for use with a fluid regulator system includes a loading inlet to receive a loading fluid from a pilot regulator and a loading outlet in fluid communication with the loading inlet. The loading outlet fluidly couples the loading inlet to a loading chamber of a fluid regulator. A vent fluidly couples the loading chamber of the fluid regulator to a source.

DETAILED DESCRIPTION

Figure 1:
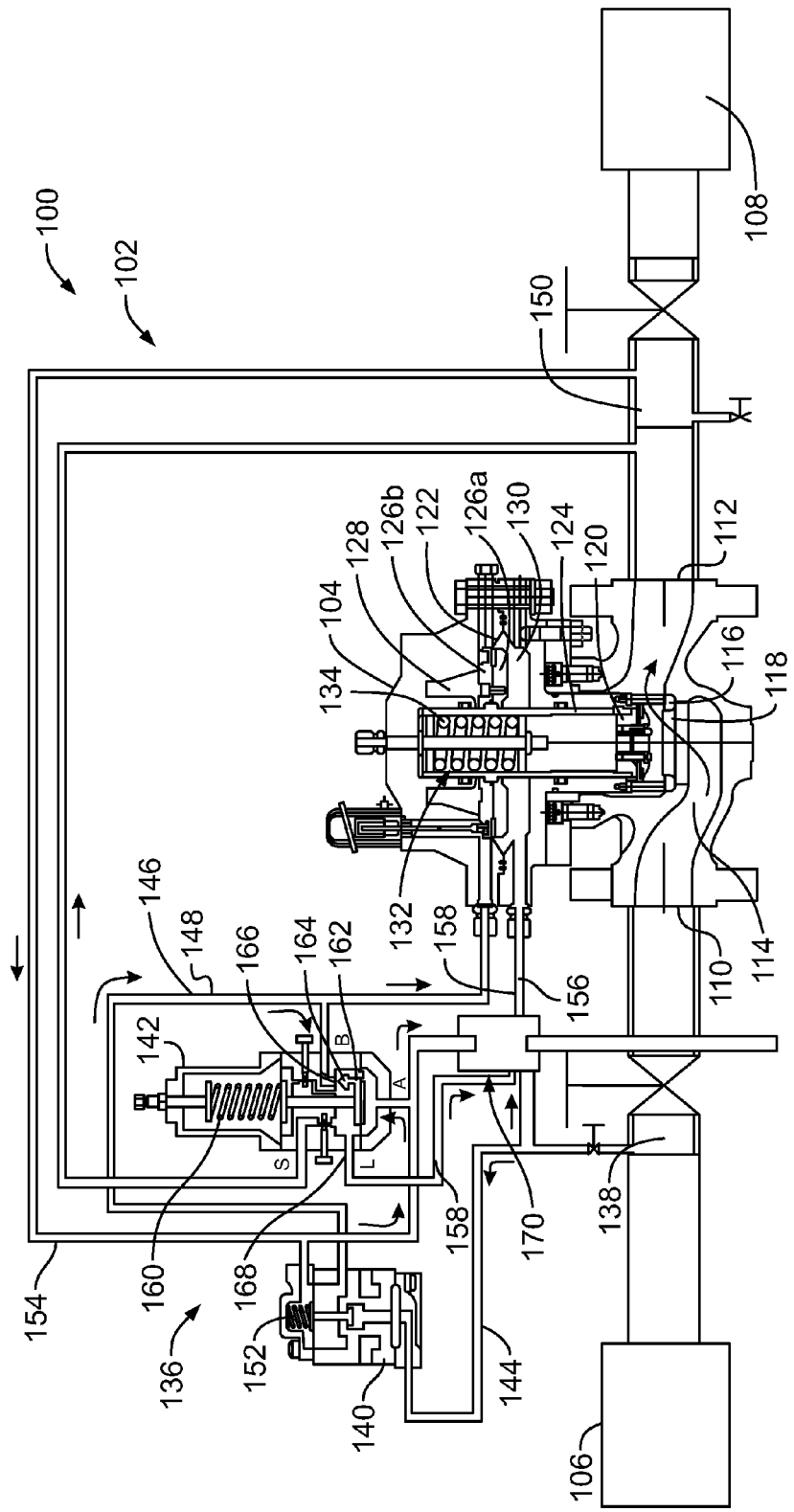
FIG. 1 is an example fluid regulator assembly having a reset apparatus described herein.

In general, the example fluid regulator systems described herein employ reset apparatus and methods to balance or reset a fluid regulator system during a startup or reset operation. In particular, to balance a spring-to-open, pilot-operated fluid regulator system, a loading fluid is typically vented from a loading chamber of a fluid regulator prior to activating a pilot system of the fluid regulator system. Known fluid regulator systems typically require an operator to manually vent a loading chamber of a fluid regulator in the field. Such known processes increase maintenance costs and shutdown duration.

In contrast to known fluid regulator systems, the example reset apparatus and methods described herein provide an automated reset or balancing operation. To automate the reset operation, the example reset apparatus described herein may employ electronically controlled flow control devices and/or mechanical flow control devices. In some examples, the reset apparatus and methods described herein enable a reset operation to be conducted remotely relative to a fluid regulator system. Alternatively, in some examples, the reset apparatus and methods described herein significantly simplify a manual reset operation of a fluid regulator system, thereby significantly reducing the time required to reset a fluid regulator system compared to known fluid regulator systems.

Generally, an example fluid regulator system described herein employs a pilot system to load a fluid regulator. An example pilot system described herein includes a first or supply regulator to provide a supply fluid to a supply chamber of the fluid regulator, and a second or pilot regulator to provide a loading fluid to a loading chamber of the fluid regulator such that the fluid in the loading chamber opposes the supply fluid in the supply chamber via a sensing element. In particular, the supply pilot uses an upstream pressure (e.g., an operating medium) and provides the supply fluid by reducing the upstream pressure to a supply fluid having a constant, pre-set pressure value based on a pressure of a downstream fluid (e.g., a control fluid) and a supply loading element of the supply regulator. The pilot regulator also receives the supply fluid and provides the loading fluid having a pressure based on the pressure of the downstream fluid and a pre-set pressure provided by a pilot loading element of the pilot regulator.

During a fail condition due to, for example, an inlet pressure of the fluid regulator dropping below a set-point of the fluid regulator or a component failure (e.g., a main actuator diaphragm rupture), an example fluid regulator system described herein moves to an open position (e.g., a spring-to-open regulator). After a fail condition, a loading fluid within a loading chamber of the fluid regulator is vented to move the fluid regulator to a closed position. The pilot system is then reactivated during a startup condition when the inlet pressure is greater than the outlet pressure plus a minimum pre-set pressure of the fluid regulator system (e.g., provided by a loading element of a fluid regulator).

The example reset apparatus described herein employ a flow control apparatus or assembly to balance or reset the fluid regulator system during a startup or a reset operation. An example fluid flow control apparatus described herein may provide a first fluid flow condition when the fluid regulator system is in a first condition or normal mode of operation and a second flow condition when the fluid regulator system is in a second condition or fail mode. For example, the fluid flow control apparatus may include a first fluid flow control device to fluidly couple the loading fluid from the pilot regulator to the loading chamber of the fluid regulator when the fluid regulator system is in the first condition, and a second fluid flow control device to fluidly couple the loading chamber of the fluid regulator to a secondary source or vent (e.g., the atmosphere, a tank, a downstream source, etc.) when the fluid regulator system is in the second condition.

For example, during a normal mode of operation, the first flow condition provided by the fluid flow control device enables the loading fluid to flow from the pilot regulator into the loading chamber of the fluid regulator and prevents the loading fluid in the loading chamber from flowing through the vent. During a fail condition, for example, the second flow condition provided by the flow control device prevents the loading fluid from flowing between the pilot regulator and the loading chamber of the fluid regulator to isolate or trap the loading fluid in the loading chamber of the fluid regulator.

The fluid control device may then vent the trapped loading fluid in the loading chamber. Once the operating conditions or parameters of the fluid regulator system return to acceptable limits or operating values that enable activation of the pilot system, the flow control device allows the loading fluid to flow between the pilot regulator and the loading chamber and prevents the loading fluid from flowing through the vent, thereby balancing the fluid regulator system.

In some examples, a reset operation of an example fluid regulator system may be automated. To automate a reset operation, an example reset apparatus described herein may include a controller to operate the fluid control apparatus based on a pressure differential provided by an upstream fluid and a downstream fluid and/or a pressure differential provided by the loading fluid and the supply fluid. For example, the controller may compare a pressure differential provided by the upstream and downstream pressures to a threshold value to determine if the flow control apparatus is to provide the first flow condition or the second flow condition.

In some examples, an automated reset operation may be provided by a mechanical fluid control apparatus or assembly. For example, the flow control apparatus may include a normally open isolation valve to control the loading fluid flow between the pilot regulator and the loading chamber of the fluid regulator system, and a normally closed relief valve to control the loading fluid flow between the loading chamber of the fluid regulator and the vent. For example, to move the valves between open and closed positions, the valves may sense the respective pressures of the loading fluid and the supply fluid to provide the different fluid flow conditions noted above.

Alternatively, in some examples, the fluid control apparatus may include a three-way valve fluidly coupled to a bleed port of the pilot regulator, a downstream return line and a vent. During normal operation of the fluid regulator system, the three-way valve may be moved to a first position to allow fluid flow between the bleed port and the downstream return line and prevent fluid flow between the bleed port and the vent. During a fail condition, the three-way valve may be moved to a second position to prevent fluid flow between the bleed port and the downstream return line and allow fluid flow between the bleed port and the vent, which enables the loading fluid in the loading chamber of the fluid regulator to vent to, for example, the atmosphere or a downstream source. The three-way valve may be manually moved (e.g., via a lever) between the first position and the second position or the three-way valve may be electronically moved between the first and second positions.

In some examples, an example fluid regulator system described herein may be manually reset. To facilitate a manual reset operation, an example reset apparatus described herein may include a plurality of visual indicators to provide indication of the fluid system parameters. For example, the reset apparatus may include pressure gauges to provide a visual indication of a pressure of a fluid such as, for example, a pressure of an upstream fluid or a downstream fluid, a pressure of the supply fluid or the loading fluid, etc. The reset apparatus may also include one or more position indicators to provide an indication of a position (e.g., a closed position, an open position, etc.) of a fluid control device.

FIG. 1 illustrates a process control system 100 having a pilot-operated fluid regulator assembly or system 102 described herein. The fluid regulator system 102 includes a fluid regulator 104 that reduces a pressure of a process fluid provided from an upstream source 106 and regulates the pressure to a substantially constant value for a downstream component 108. In particular, the fluid regulator 104 has an inlet 110 in fluid communication with the upstream source 106 (e.g., via a pipeline) at which relatively high pressure process fluid is presented and an outlet 112 in fluid communication with the downstream component 108 (e.g., via a pipeline) at which the fluid regulator 104 provides a process fluid at a lower and/or constant regulated downstream pressure. The fluid regulator 104 defines a fluid flow path 114 having a seating surface or seat ring 116 that defines an orifice 118 of the fluid flow path 114 to establish communication between the inlet 110 and the outlet 112.

To control or throttle fluid flow and/or pressure between the inlet 110 and the outlet 112, the fluid regulator 104 employs a flow control member or throttling element 120. The flow control member 120 is disposed within the fluid flow path 114 of the fluid regulator 104 and is operatively coupled to a sensing element or diaphragm 122 via a stem or tube 124. Diaphragm plates 126a and 126b couple or hold the diaphragm 122 in operative engagement with the tube 124. As described below, the diaphragm 122 defines a supply chamber 128 and a loading chamber 130 of the fluid regulator 104.

To provide a pre-set load or force on the diaphragm 122, the example fluid regulator 104 employs a load assembly 132. In this example, the load assembly 132 includes a biasing element 134 (e.g., a spring). The load provided by the biasing element 134 corresponds to a pre-set, constant outlet pressure or downstream pressure (e.g., a desired or target outlet pressure) of the fluid regulator 104.

Additionally, the fluid regulator system 102 employs a pilot system 136 that uses an upstream fluid 138 provided by the upstream source 106 as an operating medium or pressure to load the fluid regulator 104. In the illustrated example, the pilot system 136 includes a supply regulator 140 and a pilot regulator 142.

In particular, the supply regulator 140 receives the upstream fluid 138 via an inlet fluid line 144 and provides a substantially constant supply fluid 146 to the supply chamber 128 of the fluid regulator 104 via a supply fluid line 148. The pressure of the supply fluid 146 is based on a pressure of a downstream fluid 150 and a pressure or force provided by a supply pilot load element 152 (e.g., a biasing element) of the supply regulator 140. In other words, the supply regulator 140 reduces the inlet pressure to a constant, supply pressure based on the downstream pressure and the supply pilot load element 152. As shown, the supply regulator 140 senses the pressure of the downstream fluid 150 via a downstream fluid line 154.

The supply regulator 140 also provides the supply fluid 146 to the pilot regulator 142, which provides a loading fluid 156 to the loading chamber 130 of the fluid regulator 104 via a loading fluid line 158. The pilot regulator 142 senses the pressure of the downstream fluid 150 via the downstream fluid line 154, which opposes a pilot loading element 160 (e.g., a biasing element) via a pilot sensing element 162. A load or force provided by the pilot loading element 160 may be adjusted (e.g., increased or decreased) to provide a pre-set pressure or load corresponding to a desired pressure of the loading fluid 156 to be provided to the loading chamber 130.

In pilot operation, the supply regulator 140 provides the supply fluid 146 to the supply chamber 128 of the fluid regulator 104 when the upstream pressure is greater than the downstream pressure plus a minimal pressure differential or pre-set pressure of the fluid regulator 104 provided by the load assembly 132. Similarly, the pilot regulator 142 provides the loading fluid 156 to the loading chamber 130 when the downstream pressure, sensed by the pilot sensing element 162, is less than the pre-set force or pressure setting provided by the pilot loading element 160.

For example, when the downstream demand increases, the downstream pressure decreases. When the downstream pressure decreases below the pre-set pressure setting provided by the pilot loading element 160, a pilot valve plug 164 moves away from a pilot valve seat 166 to provide the loading fluid 156 to the loading chamber 130 of the fluid regulator 104.

The supply fluid 146 in the supply chamber 128 of the fluid regulator 104 opposes the loading fluid 156 in the loading chamber 130 of the fluid regulator 104. In particular, a pressure differential provided by the supply fluid 146 and the loading fluid 156 across the diaphragm 122 of the fluid regulator 104 causes the flow control member 120 to move relative (e.g., move away or toward) the seat ring 116 to allow fluid flow through the orifice 118 (e.g., an open position) or restrict fluid flow through the orifice 118 (e.g., a closed position). For example, a force imparted by the loading fluid 156 and the biasing element 134 to the diaphragm 122 that is greater than the force imparted by the supply fluid 146 to the diaphragm 122 causes the flow control member 120 to move away from the seat ring 116 to allow fluid flow between the inlet 110 and the outlet 112 (e.g., an open position). Additionally, the biasing element 134 opposes the supply fluid 146 in the supply chamber 128.

Similarly, when the downstream demand decreases, the downstream pressure increases. A downstream pressure that is greater than the desired pre-set pressure setting provided by the pilot loading element 160 of the pilot regulator 142 causes the pilot valve plug 164 to engage the pilot valve seat 166 to restrict or reduce the loading fluid 156 from flowing between an outlet 168 of the pilot regulator 142 and the loading chamber 130. In turn, the supply fluid 146 in the supply chamber 128 having a pressure greater than the pressure of the loading fluid 156 and the biasing element 134 causes the diaphragm 122 to move the flow control member 120 toward the seat ring 116 to restrict fluid flow between the inlet 110 and the outlet 112 (e.g., a closed position).

In normal operation, the upstream pressure is relatively greater than the downstream pressure (e.g., when the upstream pressure is greater than set-point provided by the load assembly 132). Thus, when the pressure at the inlet 110 is greater than the downstream pressure at the outlet 112 plus a minimum pressure differential of the fluid regulator system 102 provided by the biasing element 134, the supply regulator 140 moves to an open position and provides the supply fluid 146 to the pilot regulator 142 and the supply chamber 128 of the fluid regulator 104. However, when the upstream pressure is less than or equal to the downstream pressure (e.g., the upstream pressure falls below the set point of the load assembly 132), a fail or non-operational condition exists, causing the supply regulator 140 to move to a closed position at which the supply fluid is not provided to the supply chamber 128 or the pilot regulator 142.

During a fail condition, the fluid regulator 104 moves to an open position (e.g., a fully open position) because the supply fluid 146 provides a pressure that is significantly less than the loading fluid 156 (or downstream fluid 150) and, thus, does not oppose the biasing element 134 and/or the loading fluid 156. In turn, the biasing element 134 biases the flow control member 120 to an open position. Thus, the fluid regulator system 102 of the illustrated example provides a pilot operated, spring-to-open configuration.

Additionally, a downstream pressure that is greater than the pre-set pressure provided by the pilot loading element 160 of the pilot regulator 142 causes the pilot valve plug 164 to move into sealing engagement with the pilot valve seat 166 (e.g., a closed position) to restrict or prevent fluid flow therethrough, thereby trapping the loading fluid 156 in the loading fluid line 158 between the pilot regulator 142 and the loading chamber 130 of the fluid regulator 104.

After a fail condition, the fluid regulator system 102 is reset because the fluid regulator system 102 operates based on a balanced system. For example, after a fail condition, failure to reset the fluid regulator system 102 may cause the fluid regulator 104 to remain in an open position. In other words, the fluid regulator 102 is unbalanced, causing the fluid regulator 104 to remain in the open position because the pressure of the supply fluid will not reach a pressure level or value greater than the pressure level or value of the loading fluid and the force provided by the biasing element 132 to move the flow control member 120 to a closed position.

To balance the fluid regulator system 102 after a fail condition or during a startup condition, the loading fluid 156 in the loading chamber 130 of the fluid regulator 104 is vented. A start-up condition exists, for example, when the upstream pressure returns to a pressure that is greater than the downstream pressure plus a minimum pressure differential of the fluid regulator system 102 (e.g., a pressure that correlates to the setting provided by the load assembly 132 of the fluid regulator 104).

In known systems, the loading fluid 156 in the loading chamber 130 is manually vented in the field by an operator. Such known methods significantly increase maintenance costs and system shutdown duration. In contrast to known fluid regulator systems, the fluid regulator system 102 of FIG. 1 provides an automated startup or reset process to balance the fluid regulator system 102 during startup, thereby significantly decreasing shutdown duration and/or maintenance costs.

To provide an automated startup or reset process, the example fluid regulator system 102 of the illustrated example includes a startup or reset system 170. In particular, the reset system 170 does not require an operator to manually bleed or vent the loading chamber 130 of the fluid regulator 104. The reset system 170 of the illustrated example is disposed between the pilot regulator 142 and the fluid regulator 104. In particular, the reset system 170 is disposed between the outlet 168 of the pilot regulator 142 and the loading chamber 130 of the fluid regulator 104. More specifically, the reset system 170 isolates the loading fluid line 158 during a fail condition and vents the loading chamber 130 during a startup operation.

Figure 2A:
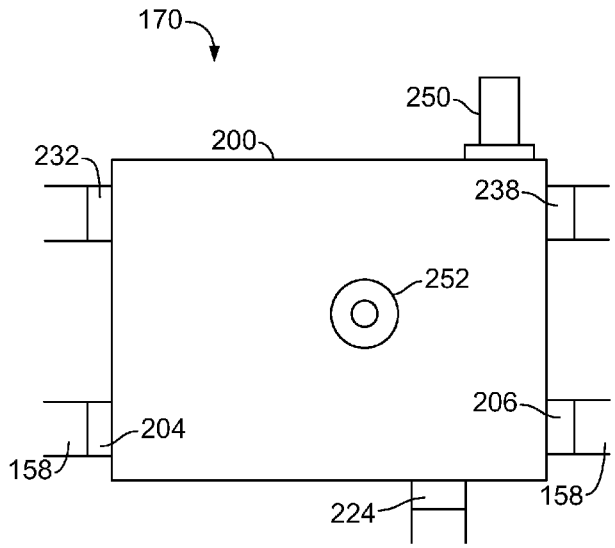
FIG. 2A is a front view of the example reset apparatus of FIG. 1.
Figure 2B:
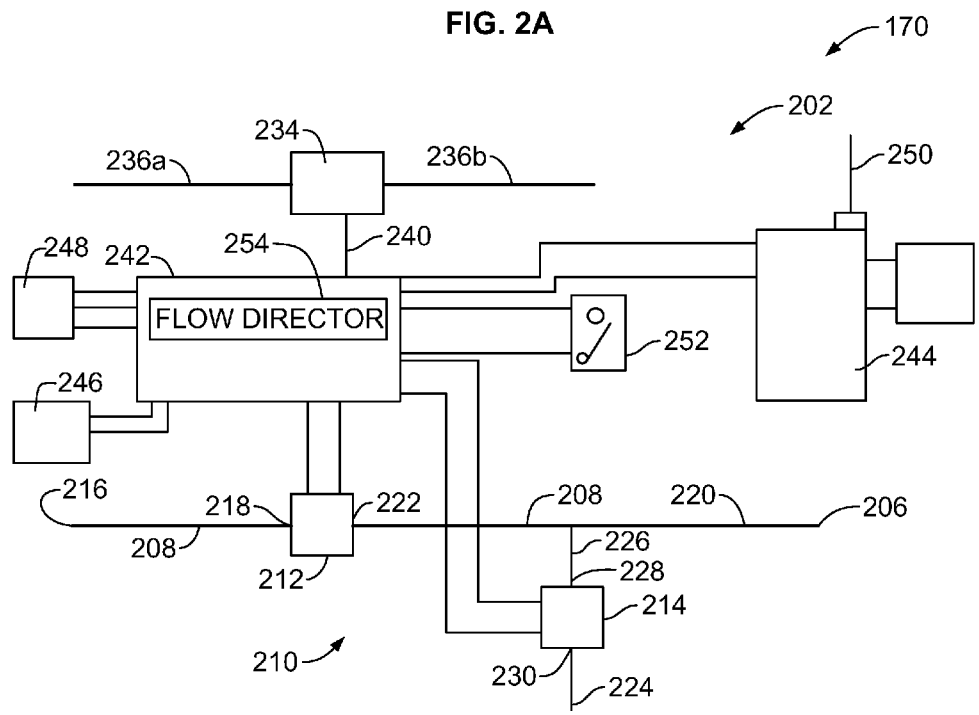
FIG. 2B is a schematic illustration of the example reset apparatus of FIGS. 1 and 2A.

FIG. 2A depicts the example reset system 170 of FIG. 1. FIG. 2B is a schematic illustration of the example reset system 170 of FIGS. 1 and 2A. As shown in FIGS. 2A and 2B, the reset system 170 includes a housing 200 having a flow control assembly 202. The housing 200 includes a loading pressure inlet port 204 and a loading pressure outlet port 206 to fluidly couple the loading fluid 156 from the pilot regulator 142 to the loading chamber 130 of the fluid regulator 104 via a loading pressure flow path 208. More specifically, the loading pressure inlet port 204 is fluidly coupled to the outlet 168 of the pilot regulator 142 and the loading pressure outlet port 206 is fluidly coupled to the loading chamber 130 of the fluid regulator 104. Alternatively, the loading pressure inlet port 204 may be fluidly coupled to the supply fluid 146 or the supply chamber 128.

The reset system 170 includes a flow control system 210 to provide different fluid flow conditions. In this example, the flow control system 210 includes a first fluid control device 212 (e.g., a solenoid valve) and a second fluid control device 214 (e.g., a solenoid valve). The first fluid control device 212 is disposed in the flow path 208 between the loading pressure inlet and outlet ports 204 and 206. In particular, a first portion 216 of the flow path 208 is fluidly coupled to an inlet 218 of the first fluid control device 212 and a second portion 220 of the flow path 208 is fluidly coupled to an outlet 222 of the first fluid control device 212. The first portion 216 of the flow path 208 fluidly couples the loading pressure inlet port 204 and the inlet 218 of the first fluid control device 212 and the second portion 220 of the flow path 208 fluidly couples the outlet 222 of the first fluid control device 212 and the loading chamber 130 of the fluid regulator 104. The first fluid control device 212 moves between an open position to allow the loading fluid 156 to flow between the loading pressure inlet and outlet ports 204 and 206 and a closed position to prevent the loading fluid 156 from flowing between the loading pressure inlet and outlet ports 204 and 206. Thus, when the first fluid control device 212 is in the open position, the loading fluid 156 can flow between the pilot regulator 142 and the fluid regulator 104 and, in the closed position, the loading fluid 156 is prevented from flowing between the pilot regulator 142 and the fluid regulator 104.

Additionally, the housing 200 of the reset system 170 includes a bleed or vent port 224. The vent port 224 fluidly couples the loading pressure outlet port 206 to a secondary source such as, for example, the atmosphere, a tank, the downstream component 108. As shown, the vent port 224 is coupled to the secondary source via a vent path 226. The second fluid flow control device 214 is disposed between the loading pressure outlet port 206 and the vent port 224. In particular, the second portion 220 of the flow path 208 is in fluid communication with an inlet 228 of the second fluid flow control device 214 and an outlet 230 of the second fluid control device 214 is in fluid communication with the vent port 224. The second fluid control device 214 moves between an open position to allow fluid flow between the loading pressure outlet port 206 and the vent port 224 and a closed position to prevent fluid flow between the loading pressure outlet port 206 and the vent port 224. As noted above, the loading pressure outlet port 206 is fluidly coupled to the loading chamber 130 of the fluid regulator 104. The second fluid control device 214 moves between an open position to vent the loading fluid 156 in the loading chamber 130 of the fluid regulator 104 via the vent path 226 and a closed position to prevent the loading fluid 156 in the loading chamber 130 from flowing to the vent port 224 via the vent path 226.

The housing 200 also includes an inlet port 232 that fluidly couples the upstream fluid 138 to a pressure sensor 234 of the reset system 170 via an inlet pressure fluid line 236a and an outlet port 238 that fluidly couples the downstream pressure to the pressure sensor 234 via an outlet pressure fluid line 236b. For example, the outlet pressure fluid line 236b may be fluidly coupled to the downstream fluid line 154. The pressure sensor 234 measures and/or senses the pressure of the upstream fluid 138 and the downstream fluid 150 and provides a signal 240 to a controller or logic circuit 242, which monitors the pressure of the upstream fluid 138 and/or downstream fluid 150. The pressure sensor 234 may be one sensor or a plurality of sensors.

The controller 242 of the illustrated example has an input/output capability and can communicate with a communication device 244, a power source 246 (e.g., a battery, a solar panel, alternating current, etc.), a remote terminal unit 248 (RTU), and/or other hardware components. The communication device 244 includes an antenna 250 to receive/send a signal from/to, for example, a control room, and/or any other remote computer or device to initiate a reset process (e.g., the example reset process 400 of FIG. 4) when a startup or reset is required. The communication device 244 is electronically coupled to the controller 242. The remote terminal unit 248 (RTU) is communicatively coupled to the controller 242 to enable, for example, the controller 242 to receive and/or send control operations (e.g., via HART protocol), data collection, protocol cross-referencing and/or data exchange with a remote control center, etc. Additionally, the reset system 170 of the illustrated example includes a switch or reset button 252 to enable an operator to manually initiate a startup or reset operation.

To determine the flow paths of the loading fluid 156, the controller 242 employs a flow director 254. In particular, the flow director 254 commands the first and second fluid control devices 212 and 214 to move between the open and closed positions. For example, during a non-fail condition or operation (e.g., a normal operation), the controller 242 and/or flow director 254 causes the first fluid control device 212 to move to an open position to allow the loading fluid 156 to flow through the portions 216 and 220 of the flow path 208 between the loading inlet pressure port 204 and the loading pressure outlet port 206. Also, the controller 242 and/or flow director 254 causes the second fluid control device 214 to move to a closed position to prevent fluid flow through the vent path 226 between the loading pressure outlet port 206 and the vent port 224. In other words, when the fluid regulator system 102 of FIG. 1 is in a non-fail condition, the loading fluid 156 is able to flow between the pilot regulator 142 and the loading chamber 130.

During a startup or reset process (e.g., after a fail condition), the reset system 170 vents the loading chamber 130 of the fluid regulator 104 to reset the fluid regulator system 102. The controller 242 and/or flow director 254 causes the first fluid control device 212 to move to a closed position to prevent fluid flow between the loading pressure inlet and outlet ports 204 and 206. Moving the first fluid control device 212 to the closed position isolates the flow path 208 between the outlet 222 of the first fluid control device 212 and the loading chamber 130 of the fluid regulator 104 to prevent the loading fluid 156 from flowing between the pilot regulator 142 and the loading chamber 130. Once the loading chamber 130 is isolated, the controller 242 and/or the flow director 254 causes the second fluid control device 214 to move to an open position to bleed or vent the loading fluid 156 in the second portion 220 via the vent path 226. In other words, loading fluid 156 in the loading chamber 130 vents to, for example, the atmosphere via the second portion 220, through the second fluid control device 214 and to the vent port 224. With the loading chamber 130 vented, the fluid regulator 104 moves to the closed position when the supply fluid 146 in the supply chamber 128 provides a pressure greater than the pre-set pressure setting provided by the biasing element 134.

After the loading chamber 130 is vented, the pressure sensor 234 detects the pressure of the upstream fluid 138 and the downstream fluid 150 and sends a signal to the controller 242. The controller 242 processes the signal and causes the first flow control device 212 to move to the open position and causes the second fluid control device 214 to move to the closed position when an upstream pressure and downstream pressure differential is at least greater than a minimum threshold value or range (e.g., the pre-set pressure of the biasing element 134, 55 psi, etc.). With the first fluid control device 212 in the open position and the second fluid control device 214 is in the closed position, the loading fluid 156 flows from the pilot regulator 142, through the first fluid control device 212, and to the loading chamber 130 of the fluid regulator 104 via the portions 216 and 220 of the flow path 208.

Alternatively, in other examples, the flow control assembly 202 may be a three-way fluid valve or a three-way, spring return solenoid valve. For example, the three-way valve may have a first port in fluid communication with the loading fluid 156, a second port fluidly coupled to the loading chamber 130, and a third port fluidly coupled to the vent port 224. In operation, the three-way solenoid valve is positioned between a first position to fluidly couple the first and second ports and prevent fluid flow through the third port, and a second position to fluidly couple the second port and the vent and prevent fluid flow through the first port.

Figure 3:
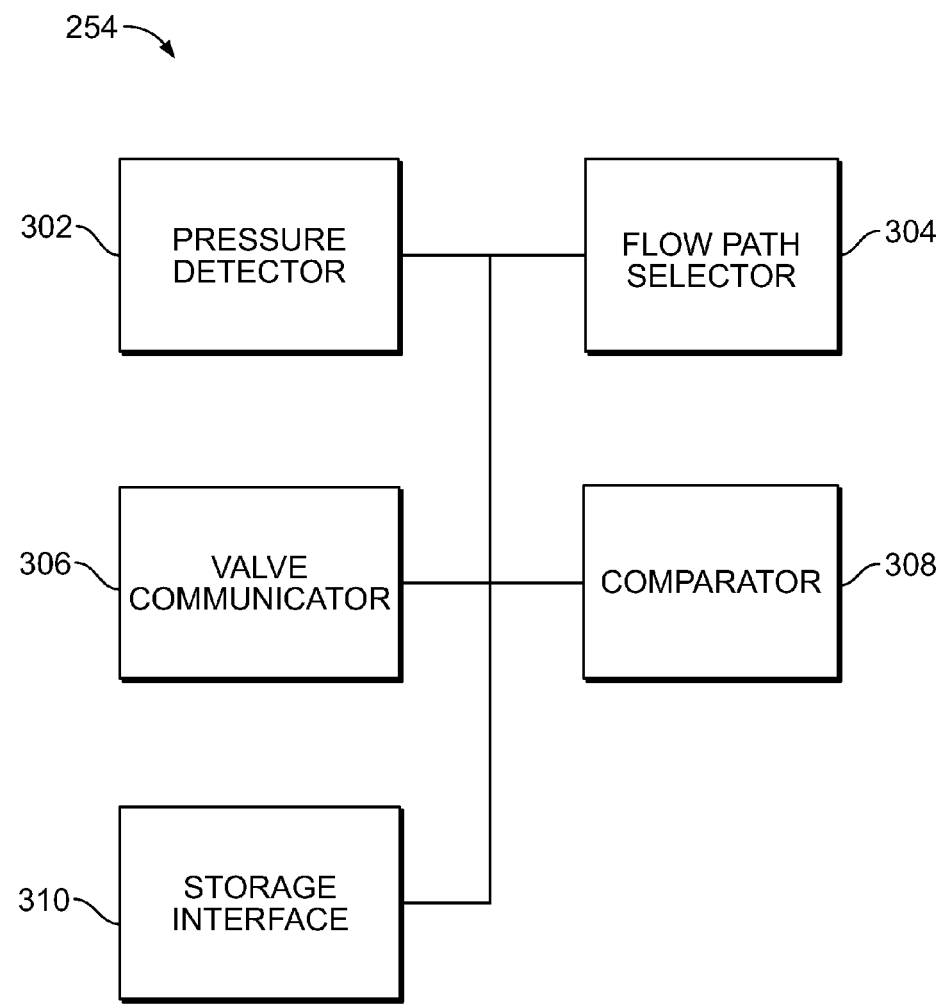
FIG. 3 is a block diagram of an example flow director of the example reset apparatus of FIGS. 1, 2A and 2B.

FIG. 3 is a block diaphragm of the example flow director 254 of FIG. 2B. The flow director 254 includes a pressure detector 302, a flow path selector 304, a valve communicator 306, a comparator 308 and a storage interface 310, all of which may be communicatively coupled as shown or in any other suitable manner. The flow director 254 may be configured to communicate with (e.g., receive/send a signal from/to) the communication device 244, the pressure sensor 302, the switch 256, the RTU 248, the first and second fluid control devices 212 and/or 214 and/or any other communication device, protocol, and/or system.

The pressure detector 302 may be configured to detect a pressure value of the upstream fluid 138 and/or a pressure value of the downstream fluid 150. For example, the pressure detector 302 may be configured to receive the pressure values measured by the pressure sensor 234. The pressure detector 302 can then communicate the measured pressure value to the comparator 308, the controller 242 and/or the storage interface 310.

The comparator 308 may be configured to compare the measured upstream pressure and the downstream pressure values provided by the pressure sensor 234 to determine a measured pressure differential between the pressure of the upstream fluid 138 and the pressure of the downstream fluid 150. The comparator 308 and/or the controller 242 may also determine if the measured pressure differential value is greater than a first or vent threshold pressure differential value (e.g., retrieved from the storage interface 310 or a look-up table). A first threshold pressure differential value may be, for example, a pressure of the upstream fluid 138 being greater than the downstream fluid 150 plus the pressure provided by the load assembly 132. Additionally or alternatively, the comparator 308 and/or the controller 242 can determine if the pressure differential value between the upstream fluid 138 and the downstream fluid 150 is greater than a second or operating threshold value (e.g., a pressure differential greater than the load provided by the biasing element 132 or 55 psi).

The controller 242 and/or the comparator 308 may communicate the pressure differential values to the flow path selector 304 and/or the valve communicator 306.

The flow path selector 304 may be configured to receive the pressure differential values provided by the comparator 308 and/or the controller 242 to determine whether the flow path 208 or the vent path 226 should be open or closed. For example, the flow path selector 304 may receive a pressure differential value from the comparator 308 and/or the controller 242 and, based on the pressure differential value, the flow path selector 304 determines if the flow path 208 should be open or closed and/or whether the vent path 226 should be opened or closed. The flow path selector 304 communicates or sends a signal to the valve communicator 306 and/or the controller 242.

The valve communicator 306 is configured to receive the signal from the flow path selector 304. Alternatively, the valve communicator 306 may receive the signal from the comparator 308 and/or the controller 242. The valve communicator 306 causes the first and second fluid control devices 212 and 214 to move between their respective open and closed positions based on the signal provided by the flow path selector 304.

If the flow path selector 304 determines that the pressure differential value is greater than a first threshold value, then flow path selector 304 sends a signal to the valve communicator 306. The valve communicator 306, in turn, may cause the first fluid control device 212 to move to an open position to allow fluid flow through the flow path 208 (e.g., portions 216 and 220), and the flow path selector 304 may send a signal to the valve communicator 306 to cause the second fluid control device 214 to move to a closed position to prevent fluid flow through the vent path 226. For example, if the pressure differential value is less than the first threshold value, then the flow path selector 304 may send a signal to the valve communicator 306 to cause the first fluid control device 212 to move to a closed position, and the flow path selector 304 may send a signal to the valve communicator 306 to cause the second fluid control device 214 to move to a closed position, thereby trapping the loading fluid 156 in the loading chamber 130 of the fluid regulator 104 and the second portion 220.

During a reset operation (e.g., when a reset is initiated via the reset button 256 or a signal received by the communication device 244), the flow path selector 304 may send a signal to the valve communicator 306 to cause the first fluid control device 212 to move to the closed position and the flow path selector 304 may send a signal to the valve communicator 306 to cause the second fluid control device 214 to move to an open position to vent the loading chamber 130 of the fluid regulator 104 via the vent path 226 and the vent port 224.

After the loading chamber 130 is vented, the pressure detector 302 monitors the pressure differential between the upstream fluid 138 and the downstream fluid 150 to determine if a pressure differential value is greater than the operating threshold. For example, the pressure detector 302 measures the upstream pressure and the downstream pressure values and sends the measured values to the comparator 308. The comparator 308 compares the values to determine if the upstream pressure and the downstream pressure differential is greater than a minimum operating threshold (e.g., a pressure differential of at least 55 psi). When the pressure differential is within the operating threshold, the flow path selector 304 may send a signal to the valve communicator 306 to cause the first fluid control device 212 to move to an open position and the flow path selector 304 may send a signal to the valve communicator 306 to cause the second fluid control device 214 to move to the closed position.

Additionally or alternatively, the pressure sensor 234 of the reset system 170 may monitor the pressure of the loading fluid 138 and automatically start the fluid regulator system 102 based on the pressure of the loading fluid 138 prior to a fail condition. For example, the storage interface 310 may store a pressure value of the loading fluid 138 during normal operation. After a fail condition, the comparator 308 compares the measured pressure values of the loading fluid 138 and the controller 242 starts the fluid regulator system 102 when the measured pressure value is greater than or equal to the measured pre-failure pressure value.

While an example manner of implementing the reset system 170 of FIGS. 1, 2A, 2B and 3 has been illustrated in FIG. 3, one or more of the elements, processes and/or devices illustrated in FIG. 3 may be combined, divided, re-arranged, omitted, eliminated and/or implemented in any other way. Further, the example reset system 170, the example pressure detector 302, the flow path selector 304, the valve communicator 306, the comparator 308, the storage interface 310 and/or, more generally, the example the reset system 170 of FIGS. 1, 2A, 2B and 3 may be implemented by hardware, software, firmware and/or any combination of hardware, software and/or firmware. Thus, for example, any of the example system 300, the example pressure detector 302, the flow path selector 304, the valve communicator 306, the comparator 308, the storage interface 310 and/or, more generally, the example the reset system 170 of FIGS. 1, 2A, 2B and 3 could be implemented by one or more circuit(s), programmable processor(s), application specific integrated circuit(s) (ASIC(s)), programmable logic device(s) (PLD(s)) and/or field programmable logic device(s) (FPLD(s)), etc. The example reset system 170 may include one or more elements, processes and/or devices in addition to, or instead of, those illustrated in FIG. 3, and/or may include more than one of any or all of the illustrated elements, processes and devices.

Figure 4:
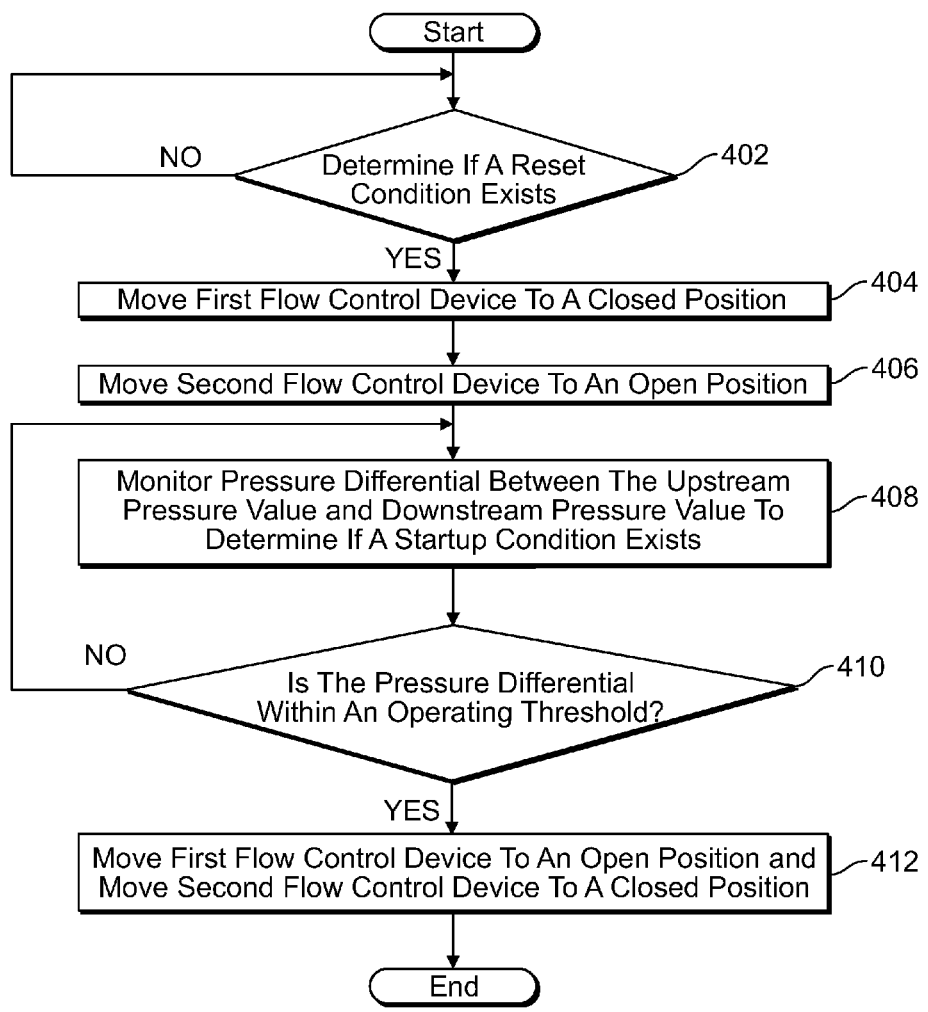
FIG. 4 is a flowchart representative of an example method that may be implemented with the example reset apparatus of FIGS. 1, 2A, 2B and 3.

FIG. 4 illustrates a flowchart representative of an example method for implementing the example reset system 170 of FIGS. 1, 2A, 2B and 3 and/or the flow director 254 of FIG. 3. In this example, the method comprises a program for execution by a processor such as the processor 512 shown in the example processing system 500 discussed below in connection with FIG. 5. The program may be embodied in software stored on a tangible computer readable medium such as a CD-ROM, a floppy disk, a hard drive, a digital versatile disk (DVD), or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example reset system 170 and/or the flow director 254 may alternatively be used. For example, the order of execution of the blocks may be changed, and/or some of the blocks described may be changed, eliminated, or combined.

As mentioned above, the example process of FIG. 4 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example process of FIG. 4 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

For purposes of discussion, the example process 400 of FIG. 4 is described in connection with the example reset system 170 and the example flow director 254. In this manner, each of the example operations of the example process 400 of FIG. 4 is an example manner of implementing a corresponding one or more operations performed by one or more of the blocks of the example flow director 254 of FIG. 3.

Turning in detail to FIG. 4, the pressure detector 302 of the reset system 170 detects or determines if a reset condition exists (block 402). For example, the pressure detector 302 monitors the upstream pressure value and the downstream pressure value by receiving the measured upstream and downstream pressure values from the pressure sensor 234. The pressure detector 302 sends the measured upstream pressure value and the measured downstream pressure value to the comparator 308. Specifically, to determine if a reset condition exists, the controller 242 may determine if the measured pressure value of the upstream fluid 138 is less than or equal to a first threshold. For example, the first threshold pressure differential value may be, for example, an upstream pressure value less than or equal to the downstream pressure value. Alternatively, in other examples, the controller 242 can receive a signal that a reset condition exists. For example, the controller 242 can receive a signal from the reset button 252 or receive a signal from the communication apparatus 244.

If the upstream pressure is greater than the first threshold value, then the controller 242 determines that a reset condition does not exist at block 402 (i.e., the measured upstream pressure value is greater than the downstream pressure value plus the pressure provided by the biasing element 134) and the process 400 remains at block 402.

If the upstream pressure is less than or equal to the first threshold value, then the controller 242 determines that the reset condition exists (block 402). If the reset condition exists at block 402, then flow path selector 304 causes the first fluid control device 212 to move to a closed position (block 404). For example, the flow path selector 304 sends a signal to the valve communicator 306 to cause the first fluid control device 212 to move to the closed position.

After the first fluid control device 212 is moved to the closed position (block 404), the flow path selector 304 causes the second fluid control device 214 to move to an open position (block 406). For example, the flow path selector 304 sends a signal to the valve communicator 306 to cause the second fluid control device 214 to move to the open position to vent the loading chamber 130 of the fluid regulator 104 via the vent port 224.

With the second fluid control device 214 in the open position, the pressure detector 302 continues to monitor a measured pressure differential between the upstream pressure and the downstream pressure to determine if a startup condition exists (block 408). For example, the pressure sensor 234 measures the upstream pressure value and the downstream pressure value and sends the measured values to the controller 242 and/or the comparator 308.

The pressure detector 302, the controller 242 and/or the comparator 308 determine if the pressure differential between the measured upstream pressure value and the downstream pressure provided by the pressure detector is within an operating threshold (block 410). For example, the operating threshold value may be, for example, an upstream pressure value greater than or equal to the downstream pressure value plus the minimum pressure differential of the fluid regulator system 102 (e.g., a pressure provided by the biasing element 134 of the fluid regulator 104).

If the measured pressure differential is not greater than the operating threshold, then the process 400 returns to block 410 (block 410).

If the measured pressure differential is within the operating threshold, then the first flow control device 212 moves to the open position and the second fluid control device 214 moves to the closed position (block 412). For example, the flow path selector 304 determines that the first fluid control device 212 is to move to an open position and determines that the second fluid control device 214 is to move to a closed position and sends a signal to the valve communicator 306 to cause the first fluid device 212 to move to the open position and the second fluid control device 214 to move to the closed position.

Figure 5:
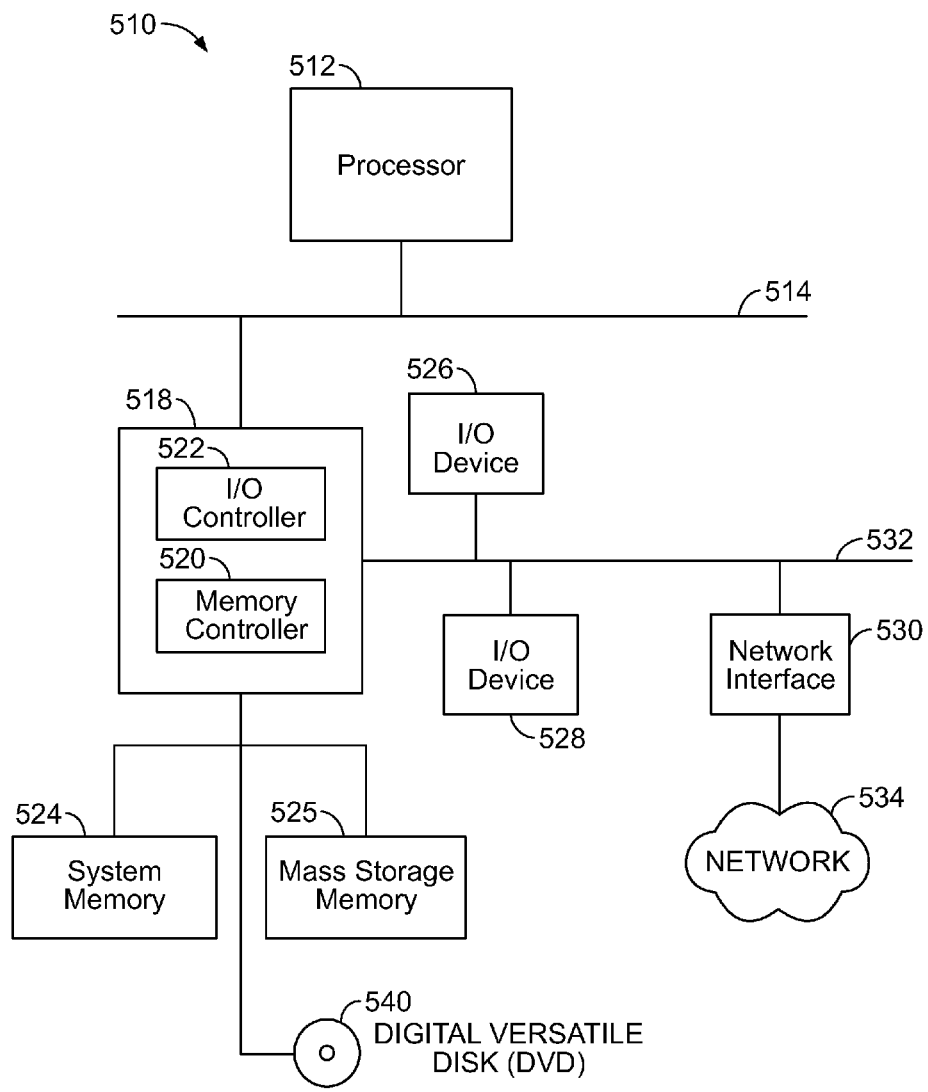
FIG. 5 is a block diagram of an example processor system that may be used to implement the example methods and apparatus described herein.

FIG. 5 is a block diagram of an example processor system 510 that may be used to perform the method of FIG. 4 to implement the example fluid regulator system 102, the controller 242 and/or the flow director 254 described herein.

The processor system 510 of FIG. 5 includes a processor 512 that is coupled to an interconnection bus 514. The processor 512 may be any suitable processor, processing unit, or microprocessor (e.g., one or more Intel® microprocessors from the Pentium® family, the Itanium® family or the XScale® family and/or other processors from other families). The system 510 may be a multi-processor system and, thus, may include one or more additional processors that are identical or similar to the processor 512 and that are communicatively coupled to the interconnection bus 514.

The processor 512 of FIG. 5 is coupled to a chipset 518, which includes a memory controller 520 and an input/output (I/O) controller 522. A chipset provides I/O and memory management functions as well as a plurality of general purpose and/or special purpose registers, timers, etc. that are accessible or used by one or more processors coupled to the chipset 518. The memory controller 520 performs functions that enable the processor 512 to access a system memory 524 and a mass storage memory 525, and/or a digital versatile disk (DVD) 540.

In general, the system memory 524 may include any desired type of volatile and/or non-volatile memory such as, for example, static random access memory (SRAM), dynamic random access memory (DRAM), flash memory, read-only memory (ROM), etc. The mass storage memory 525 may include any desired type of mass storage device including hard disk drives, optical drives, tape storage devices, etc. The machine readable instructions of FIG. 4 may be stored in the system memory 524, the mass storage memory 525, and/or the DVD 540.

The I/O controller 522 performs functions that enable the processor 512 to communicate with peripheral input/output (I/O) devices 526 and 528 and a network interface 530 via an I/O bus 532. The I/O devices 526 and 528 may be any desired type of I/O device such as, for example, a keyboard, a video display or monitor, a mouse, etc. The network interface 530 may be, for example, an Ethernet device, an asynchronous transfer mode (ATM) device, an 802.11 device, a DSL modem, a cable modem, a cellular modem, etc. that enables the processor system 510 to communicate with another processor system. The example network interface 530 of FIG. 5 is also communicatively coupled to a network 534, such as an intranet, a Local Area Network, a Wide Area Network, the Internet, etc.

While the memory controller 520 and the I/O controller 522 are depicted in FIG. 5 as separate functional blocks within the chipset 518, the functions performed by these blocks may be integrated within a single semiconductor circuit or may be implemented using two or more separate integrated circuits.

Figure 6A:
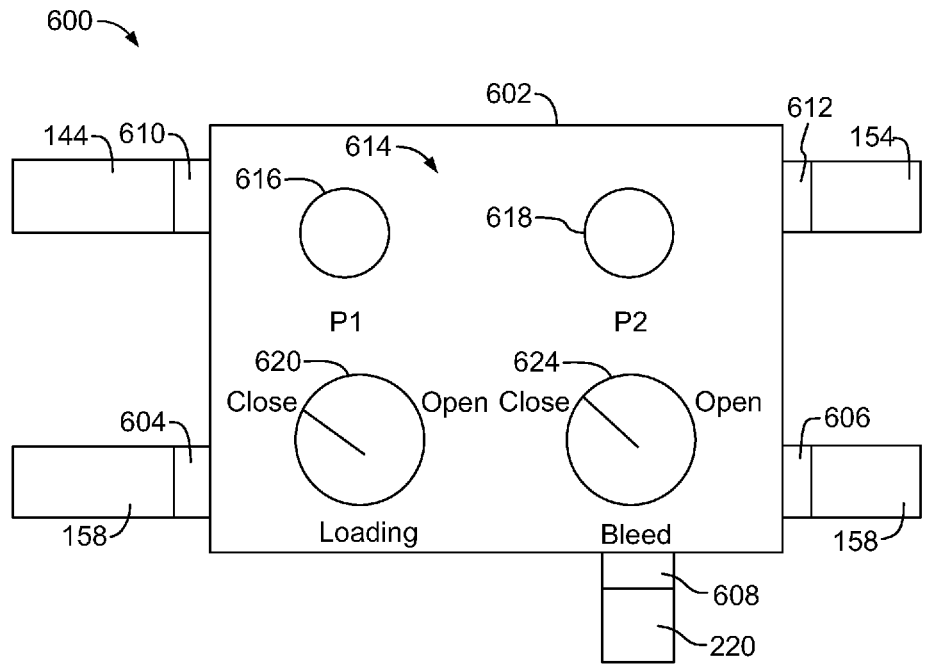
FIG. 6A illustrates another example reset apparatus described herein that may be used with a fluid regulator system.
Figure 6B:
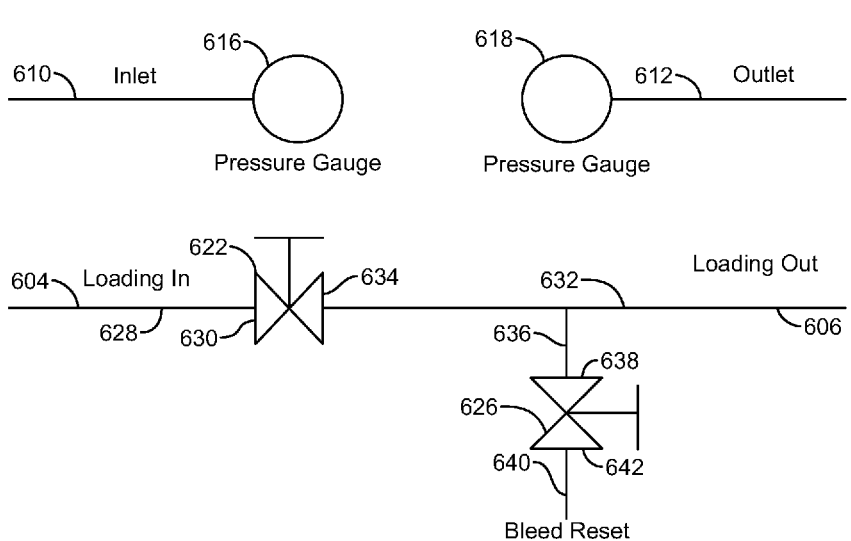
FIG. 6B is a schematic illustration of the example reset apparatus of FIG. 6A.

FIG. 6A illustrates another example reset system 600 described herein that may be used with a fluid regulator system such as the fluid regulator system 102 of FIG. 1. FIG. 6B is a schematic illustration of the example reset system 600 of FIG. 6A. Those components of the reset system 600 that are similar or identical to those components used in the fluid regulator system 102 and the reset system 170 of FIGS. 1, 2A, 2B and 3-5 are labeled with the same reference numbers.

Unlike the automated reset system 170 of FIGS. 1, 2A, 2B and 3-5, the example reset system 600 provides a manual reset system. The reset system 600 includes a housing 602 having a loading pressure inlet port 604, a loading pressure outlet port 606, a vent or bleed port 608, an inlet port 610 and an outlet port 612. Additionally, the example housing 602 includes a plurality of visual indicators 614. For example, as shown, the example housing 602 includes a first or inlet pressure gauge 616 to provide an indication of the pressure of the upstream fluid 138, a second or outlet pressure gauge 618 to provide an indication of the pressure of the downstream fluid 150, a first position indicator 620 to provide a visual indication of a position (e.g., an open position, a closed position) of a first flow control device 622 and a second position indicator 624 to provide a visual indication of a position (e.g., an open position, a closed position) of a second flow control device 626.

The loading pressure inlet port 604 receives a loading fluid from, for example, the outlet 168 of the pilot regulator 142 of FIG. 1. A fluid line 628 fluidly couples the loading pressure inlet port 604 to an inlet 630 of the first flow control device 622 (e.g., a rotary valve, etc.) and a fluid line 632 fluidly couples an outlet 634 of the first flow control device 622 and the loading pressure outlet port 606, which is fluidly coupled to the loading chamber 130 of the fluid regulator 104 via the loading fluid line 158 of FIG. 1. A fluid line 636 fluidly couples the loading pressure outlet port 606 to an inlet 638 of the second flow control device 626. A vent line 640 fluidly couples an outlet 642 of the second flow control device 626 to the vent port 608. The flow control devices 622 and 626 may be disposed or captured within the housing 602, may be located adjacent the housing 602, and/or may be located remotely from the housing 602.

In operation, an operator may use the visual indicators 614 to determine the operating parameters of the fluid regulator system 102. For example, during a fail condition, an operator can use the upstream and downstream pressure gauges 616 and 618 to determine if the upstream pressure is less than a first threshold. The first threshold may be, for example, an upstream pressure that is less than or equal to the outlet pressure. The operator can manually move the first flow control device 622 to a closed position and manually move the second flow control device 626 to an open position when the first pressure gauge 616 indicates that the upstream pressure is less than the first threshold.

Each of the position indicators 620 and 624 indicates the position of the respective flow control devices 622 and 626.

When the first flow control device 622 is in the closed position and the second flow control device 626 is in the open position, the loading fluid 156 in the loading chamber 130 of the fluid regulator 104 is vented to, for example, the atmosphere via the vent port 608 and the lines 632, 636 and 640.

After the loading chamber 130 is vented, the operator uses the pressure gauges 616 and 618 to detect when the pressure of the upstream fluid 138 is within an operating threshold. The operating threshold may be, for example, an upstream pressure that is greater than a downstream pressure plus a minimum pressure differential (e.g., 55 psi) of the fluid regulator system 102. In other words, when the operator detects via the pressure gauges 616 and 618 that the pressure differential between the upstream fluid 138 and the downstream fluid 150 is greater than at least, for example, 55 psi, the operator moves the second flow control device 626 to the closed position and moves the first flow control device 622 to the open position to allow the loading fluid 156 to flow from the pilot regulator 142 to the loading chamber 130, thereby resetting and/or rebalancing the fluid regulator system 102.

Although not shown, in some examples, the reset system 600 may include an activation switch to move the flow control devices 622 and/or 626 between their respective open and closed positions. For example, the flow control devices 622 and/or 626 may be solenoid valves and activating the switch sends a signal (e.g., an electrical signal) to move the solenoid valves between their respective open and closed position. Alternatively, an operator may manually move the flow control devices 622 and/or 626 (e.g., ball valves) between their respective open and closed positions via a lever. In yet other examples, the flow control devices 622 and/or 626 may be located remotely from the housing 602. An operator may activate a switch or button associated with the respective flow control devices 622 and/or 626 to move the flow control devices 622 and/or 626 between their respective open and closed positions. For example, activating a switch or button on the housing 602 may send a signal to a valve controller or positioner of a pneumatic valve remotely located relative to the housing 602 to cause the flow control devices 622 and/or 626 to move between their respective open and closed positions.

Figure 7:
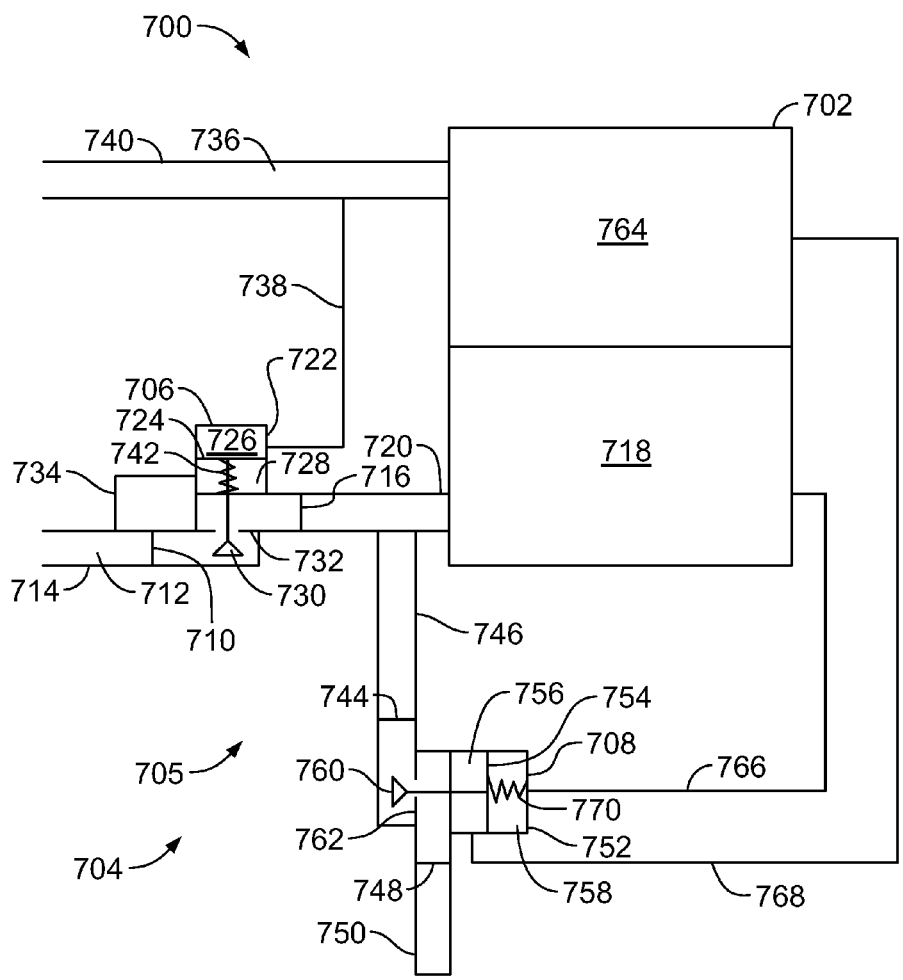
FIG. 7 illustrates another example fluid regulator system having a reset apparatus described herein.

FIG. 7 illustrates another example fluid regulator system 700 described herein having a fluid regulator 702 (e.g., the fluid regulator 104 of FIG. 1) coupled to an automated reset system 704. In this example, the reset system 704 is an automated, mechanical reset system. The reset system 704 includes a flow control apparatus or assembly 705 that includes a first flow control device 706 and a second flow control device 708. In the illustrated example, the first flow control device 706 is a normally closed (e.g., spring-to-close) isolation valve and the second fluid flow control device 708 is a normally closed (e.g., spring-to-open) pressure relief valve.

The first flow control device 706 includes an inlet 710 to receive a loading fluid 712 via an upstream fluid line 714 coupled to, for example, a pilot regulator (e.g., the outlet 168 of the pilot regulator 142 of FIG. 1). The first flow control device 706 includes an outlet 716 fluidly coupled to a loading chamber 718 of the fluid regulator 702 via a fluid line 720. The first flow control device 706 includes an actuator 722 having a sensing element 724 (e.g., a diaphragm or piston) that defines a supply chamber 726 and a loading chamber 728. The actuator 722 moves a flow control member 730 (e.g., a valve plug) relative to a valve seat 732 to allow or restrict fluid flow between the inlet 710 and the outlet 716 based on a pressure differential across the sensing element 724. The loading chamber 728 receives the loading fluid 712 from a first sensing line 734 fluidly coupled to the upstream fluid line 714 and the supply chamber 726 receives a supply fluid 736 from a second sensing line 738 fluidly coupled to a supply pressure line 740 (e.g., from the supply regulator 140 of FIG. 1). In the illustrated example, the first flow control device 706 includes a biasing element 742 to bias the flow control member 730 toward the valve seat 732 (e.g., the closed position). As shown, the biasing element 742 is disposed within the loading chamber 728 to bias the sensing element 724 in a direction away from the valve seat 732 in the orientation of FIG. 7.

The second flow control device 708 has an inlet 744 fluidly coupled to the loading chamber 718 of the fluid regulator 702 via a fluid line 746 and an outlet 748 fluid coupled to, for example, the atmosphere via a vent line 750. The second flow control device 708 includes an actuator 752 having a sensing element 754 (e.g., a diaphragm, a piston, etc.) that defines a supply chamber 756 and a loading chamber 758. The actuator 752 moves a flow control member 760 relative to a valve seat 762 to allow or restrict fluid flow between the inlet 744 and the outlet 748 based on a pressure differential across the sensing element 754. The supply chamber 756 receives or senses the pressure of the supply fluid 736 in a supply chamber 764 of the fluid regulator 702 and the loading chamber 718 receives or senses the pressure of the fluid in the loading chamber 718. In this example, the loading chamber 758 of the second flow device 708 is in fluid communication with the loading chamber 718 of the fluid regulator 702 via a first sensing line 766 and the supply chamber 756 of the second flow device 708 is in fluid communication with the supply chamber 764 of the fluid regulator 702 via a second sensing line 768. A biasing element 770 (e.g., a spring) biases the flow control member 760 of the second flow device 708 away from the valve seat 762 to an open position. As shown, the biasing element 770 is disposed within the loading chamber 758 and biases the sensing element 754 in a direction toward the valve seat 762 in the orientation of FIG. 7.

In normal operation (e.g., a non-fail condition), the first flow control device 706 is in an open position and the second flow control device 708 is in a closed position. For example, the first flow control device 706 moves to an open position when the pressure of the supply fluid 736 in the supply chamber 726 is greater than the pressure of the loading fluid 712 and the force or pressure provided by the biasing element 742 in the loading chamber 728. In the open position, the first flow control device 706 allows the loading fluid 712 to flow between the inlet 710 and the outlet 716 of the first flow control device 706 and into the loading chamber 718 of the fluid regulator 702. Likewise, the second flow control device 708 moves to a closed position when the pressure of the supply fluid in the supply chamber 756 of the second flow control device 708 is greater than the pressure of the loading fluid 712 and the force or pressure provided by the biasing element 770 in the loading chamber 758 of the second flow control device 708. In the closed position, the second flow control device 708 prevents or substantially restricts fluid flow between the loading chamber 718 of the fluid regulator 702 and the outlet 748 of the second flow control device 708 (e.g., to the atmosphere).

During a fail condition, for example, the first flow control device 706 moves to a closed position to isolate the loading chamber 718 of the fluid regulator 702. For example, the first flow control device 706 moves to a closed position to prevent fluid flow between the inlet 710 and the outlet 716 when the pressure of the supply fluid 736 in the supply chamber 726 is less than the pressure of the loading fluid 712 and the force or pressure provided by the biasing element 742 in the loading chamber 728. When moved to the closed position, the first fluid flow device 706 isolates or traps the loading fluid in the loading chamber 718 of the fluid regulator 702. Similarly, the second flow control device 708 moves to an open position to allow fluid flow between the inlet 744 and the outlet 748 of the second flow control device 708 when the pressure of the supply fluid 736 in the supply chamber 756 of the second flow control device 708 is less than the pressure of the loading fluid 712 and the force or pressure provided by the biasing element 770 in the loading chamber 758. In the open position, the second flow control device 708 allows the loading fluid 712 in the loading chamber 718 to vent through the outlet 748 of the second flow control device 708 via the fluid line 746 and the vent line 750, while the first flow control device 706 remains in the closed position.

Once the pressure of the supply fluid 736 is greater than the pressure of the loading pressure 712 and the biasing element 742, the first control device 706 moves to an open position to allow the loading fluid 712 to flow to the loading chamber 718 of the fluid regulator 702. Additionally, the second flow control member 772 moves to the closed position to prevent fluid flow between the loading chamber 718 and the outlet 748 of the second flow control device 708 when the pressure provided by the supply fluid 736 in the supply chamber 756 is greater than the pressure provided by the loading fluid 712 and the force or pressure provided by the biasing element 770 in the loading chamber 758, thereby resetting the fluid regulator system 700.

Figure 8A:
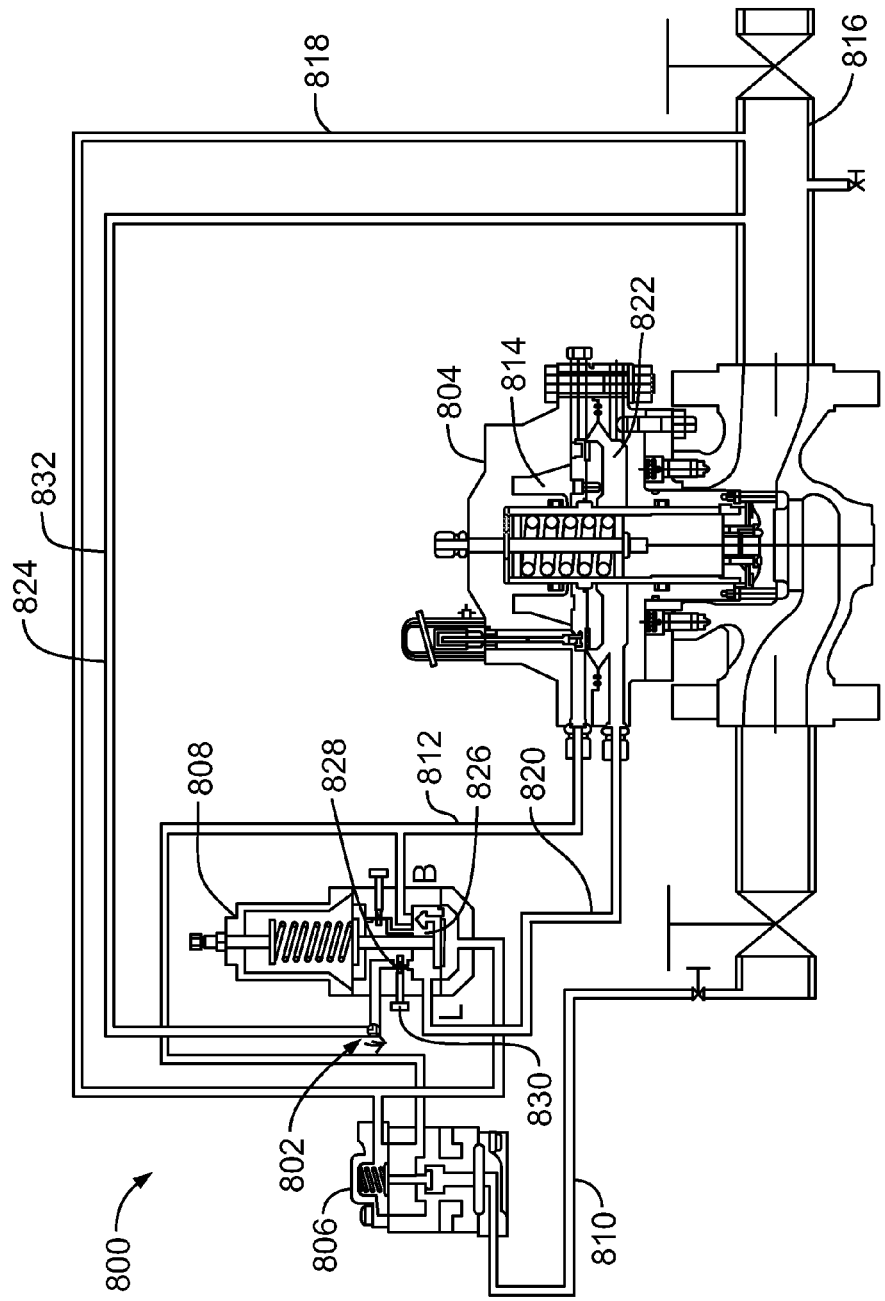
FIG. 8A illustrates another example fluid regulator system having another reset apparatus described herein.

FIG. 8A illustrates yet another example pilot-operated fluid regulator system 800 described herein having a reset system 802. The example fluid regulator system 800 includes a fluid regulator 804, a supply regulator 806 and a pilot regulator 808. More specifically, the supply regulator 806 receives a pressurized upstream fluid 810 and provides a supply fluid 812 to a supply chamber 814 of the fluid regulator 804 based on a downstream pressure 816 provided to the supply regulator 806 via a downstream fluid line 818. Additionally, the supply regulator 806 provides the supply fluid 812 to the pilot regulator 808, which further reduces the pressure of the supply fluid 812 to provide a loading fluid 820 to a loading chamber 822 of the fluid regulator 804. Excess loading fluid 824 in the loading chamber 822 and/or a chamber 826 of the pilot regulator 808 is bled or vented via a bleed restriction or port 828 of the pilot regulator 808. In this example, the pilot regulator 808 includes an adjustor 830 to adjust the rate at which the excess loading fluid 824 is bled through the bleed port 828. As shown, the excess loading fluid 824 is bled downstream of the fluid regulator 804 via a return fluid line 832.

Figure 8B:
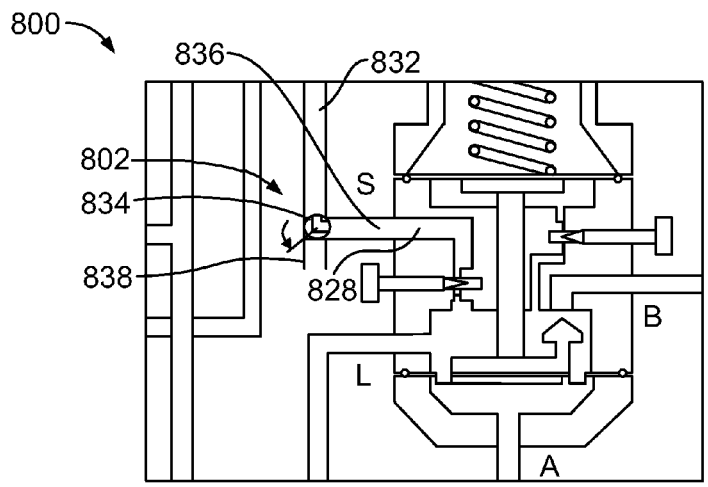
FIG. 8B is an enlarged view of a portion of the example fluid regulator system and reset apparatus of FIG. 8A.

FIG. 8B illustrates an enlarged portion of the example pilot regulator 808 of FIG. 8A. As shown in FIG. 8B, a flow control device 834 is fluidly coupled to the downstream return fluid line 832. In this example, the flow control device 834 is a three-way valve fluidly coupled to an outlet 836 of the bleed port 828, the downstream return line 832 and a vent 838 (e.g., atmosphere, a tank, etc.). Although not shown, the flow control device 834 includes a first port in fluid communication with the bleed port 828 of the pilot regulator 808, a second port in fluid communication with the downstream return line 832 and a third port in fluid communication with the vent 838.

Figures 8C, 8D:
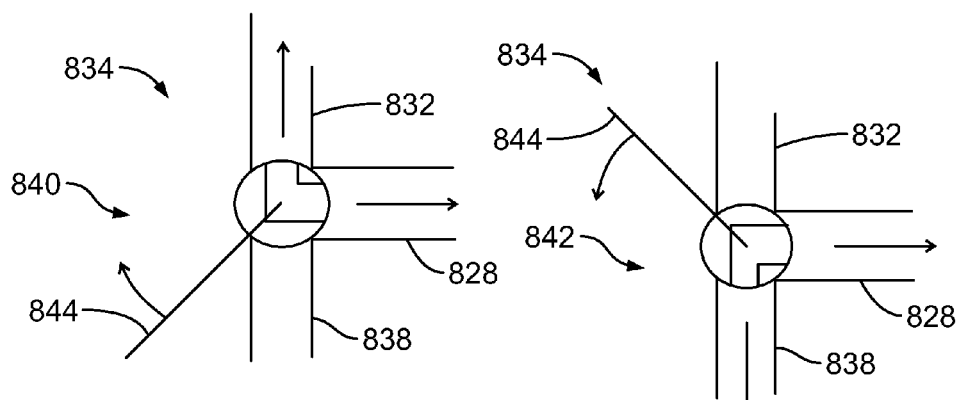
FIG. 8C illustrates the reset apparatus of FIGS. 8A and 8B in a first mode.
FIG. 8D illustrates the reset apparatus of FIGS. 8A and 8B in a second mode.

FIG. 8C illustrates the flow control device 834 in a first or run mode position 840. In normal operation (e.g., a non-fail condition), the flow control device 834 is moved to the first position 840 to fluidly couple the downstream return line 832 and the bleed port 828 to allow the excess loading fluid 824 in the chamber 826 of the pilot regulator 808 and/or the loading chamber 822 to vent downstream via the downstream return line 832. In the first position 840, the flow control device 834 prevents fluid flow between the downstream return line 832 and the vent 838. Thus, the vent 838 is in a closed position to prevent fluid flow through the vent 838 when the flow control device 834 is in the first position 840.

FIG. 8D illustrates the flow control device in a second or bleed position 842. In a fail condition, the flow control device 834 is moved to the second position 842. In the second position 842, the flow control device 834 allows fluid flow between the bleed port 828 and the vent 838 and prevents fluid flow between the bleed port 828 and the downstream return line 832. In other words, in the second position 842, the loading fluid 820 in the loading chamber 822 of the fluid regulator 804 is vented to, for example, the atmosphere via the vent 838.

In the illustrated example, an operator may manually move the flow control device 834 between the first and second positions 840 and 842 via a handle or lever 844. Alternatively, in other examples, the flow control device 834 may be automatically moved between the first and second positions 840 and 842 via, example, a system similar to that described in FIGS. 1, 2A, 2B and 3-5. For example, a system (e.g., the process 400 of FIG. 4) may detect a run or bleed mode and move the flow control device 834 to the first position 840 to allow fluid flow through the return line 832. The system may detect a reset or failure mode and may move the flow control device 834 between the first and second positions 840 and 842 to vent the loading chamber 822. The system may then move the flow control device 834 to the first position 840 when the upstream pressure is greater than an operating threshold (e.g., a pressure differential between the upstream and downstream pressures being at least greater than 55 psi).

In some examples, an operator may send a signal to the flow control device 834 from a control room. The signal may cause the flow control device 834 (e.g., a spring return, three-way solenoid valve) to move between the first and second positions 840 and 842. In yet other examples, the fluid regulator system 800 may be implemented with visual indicators and/or pressure gauges to provide an indication of the upstream pressure 810, the downstream pressure 816 and the position of the flow control device 834.

Although certain apparatus, methods and articles of manufacture have been described herein, the scope of coverage of this patent is not limited thereto. To the contrary, this patent covers all apparatus, methods and articles of manufacture fairly falling within the scope of the appended claims either literally or under the doctrine of equivalents.

What is claimed is:

1. A fluid regulator system comprising:
 a loading regulator to regulate a loading fluid based on a pressure differential of a supply fluid at an inlet and a fluid at an outlet of a fluid regulator; and
 a reset apparatus, the reset apparatus including:
  a loading inlet to receive the loading fluid from the loading regulator;
  a loading outlet in fluid communication with the loading inlet, the loading outlet to fluidly couple the loading inlet to a loading chamber of the fluid regulator during normal operation of the fluid regulator system;
  a vent to fluidly couple the loading chamber of the fluid regulator to the atmosphere during a fail condition of the fluid regulator system, the vent being in fluid communication with the loading outlet and the loading chamber;
  a supply inlet to receive a fluid upstream from the inlet of the fluid regulator;
  a supply outlet to receive a fluid downstream from the outlet of the fluid regulator; and a pressure sensor in fluid communication with the supply inlet and the supply outlet to detect a pressure differential between the upstream fluid and the downstream fluid.

2. The system defined in claim 1, wherein the reset apparatus further comprises a first fluid control device defining the loading inlet and the loading outlet, the first fluid control device to move between a first position and a second position to control fluid flow between the loading inlet and the loading outlet based on a first pressure differential provided by at least the upstream fluid and the downstream fluid.

3. The system defined in claim 2, wherein the reset apparatus further comprises a second fluid control device fluidly coupled to the vent and the loading outlet, the second fluid control device to move between a first position and a second position to control fluid flow between the loading outlet and the vent based on a second pressure differential provided by the at least the upstream fluid and the downstream fluid.

4. The system defined in claim 3, wherein the reset apparatus further comprises a housing to retain the first and second fluid control devices.

5. The system defined in claim 4, wherein each of the first and second fluid control devices comprises a solenoid valve.

6. The system defined in claim 4, wherein the reset apparatus further comprises a controller to cause the first and second fluid control devices to move between their respective first and second positions.

7. The system defined in claim 6, wherein the controller is to cause the first fluid control device to move to an open position to allow fluid flow between the loading inlet and the loading outlet and to cause the second fluid control device to move to a closed position to prevent fluid flow between the loading outlet and the vent when a pressure of the upstream fluid is greater than a first threshold.

8. The system defined in claim 3, wherein the first fluid control device comprises a first valve having an inlet in fluid communication with the loading inlet and an outlet in fluid communication with the loading outlet.

9. The system defined in claim 8, wherein the second fluid control device comprises a second valve having an inlet in fluid communication with the loading chamber of the fluid regulator and an outlet in fluid communication with the vent.

10. The system defined in claim 9, wherein, in normal operation, the first valve allows the loading fluid to flow to the loading chamber of the fluid regulator and the second valve prevents the loading fluid from flowing between the loading chamber and the vent, and wherein, in the fail condition, the first valve prevents the loading fluid from flowing to the loading chamber of the fluid regulator and the second valve allows the loading fluid in the loading chamber to flow to the vent.

11. The system defined in claim 1, wherein the reset apparatus further comprises an isolation valve defining the loading inlet and the loading outlet and a pressure relief valve fluidly coupled to the vent and the loading outlet.

12. The system defined in claim 11, wherein each of the isolation valve and the pressure relief valve moves between open and closed positions based on a pressure differential provided by a pressure of the supply fluid and a pressure of the loading fluid.

13. The system defined in claim 12, wherein each of the isolation valve and the pressure relief valve senses a pressure of the supply fluid and a pressure of the loading fluid to move between the respective open and closed positions.

14. The system defined in claim 1, wherein the reset apparatus further comprises a three-way valve defining the loading inlet, the loading outlet, and a vent outlet in communication with the vent, the three-way valve to move between a first position to control fluid flow between the loading inlet and the loading outlet and a second position to control fluid flow between the loading chamber and the vent based on the pressure differential provided by at least the upstream fluid and the downstream fluid.

15. The system defined in claim 1, wherein the fluid regulator system comprises a supply regulator, wherein the supply regulator receives the upstream fluid and provides a supply fluid to a supply chamber of the fluid regulator.

16. A reset apparatus for use with a fluid regulator system, the reset apparatus comprising:
a loading inlet to receive a loading fluid;
a loading outlet in fluid communication with the loading inlet, the loading outlet to fluidly couple the loading inlet to a loading chamber of a fluid regulator during normal operation of the fluid regulator system;
a vent to fluidly couple the loading chamber of the fluid regulator to the atmosphere during a fail condition of the fluid regulator system, the vent being in fluid communication with the loading outlet and the loading chamber;
a supply inlet to receive a fluid upstream from an inlet of the fluid regulator;
a supply outlet to receive a fluid downstream from an outlet of the fluid regulator;
a pressure sensor in fluid communication with the supply inlet and the supply outlet to detect a pressure differential between the upstream fluid and the downstream fluid;
a first fluid control device defining the loading inlet and the loading outlet, the first fluid control device to move between a first position and a second position to control fluid flow between the loading inlet and the loading outlet based on a first pressure differential provided by at least the upstream fluid and the downstream fluid;
a second fluid control device fluidly coupled to the vent and the loading outlet, the second fluid control device to move between a first position and a second position to control fluid flow between the loading outlet and the vent based on a second pressure differential provided by the at least the upstream fluid and the downstream fluid;
a housing to retain the first and second fluid control devices; and
a mechanical switch located on the housing of the reset apparatus to move the first and second fluid control devices between their respective first and second positions.

17. A reset apparatus for use with a fluid regulator system, the reset apparatus comprising:
a loading inlet to receive a loading fluid;
a loading outlet in fluid communication with the loading inlet, the loading outlet to fluidly couple the loading inlet to a loading chamber of a fluid regulator during normal operation of the fluid regulator system;
a vent to fluidly couple the loading chamber of the fluid regulator to the atmosphere during a fail condition of the fluid regulator system, the vent being in fluid communication with the loading outlet and the loading chamber;
a supply inlet to receive a fluid upstream from an inlet of the fluid regulator;
a supply outlet to receive a fluid downstream from an outlet of the fluid regulator;
a pressure sensor in fluid communication with the supply inlet and the supply outlet to detect a pressure differential between the upstream fluid and the downstream fluid;

a first fluid control device defining the loading inlet and the loading outlet, the first fluid control device to move between a first position and a second position to control fluid flow between the loading inlet and the loading outlet based on a first pressure differential provided by at least the upstream fluid and the downstream fluid;

a second fluid control device fluidly coupled to the vent and the loading outlet, the second fluid control device to move between a first position and a second position to control fluid flow between the loading outlet and the vent based on a second pressure differential provided by the at least the upstream fluid and the downstream fluid; and a housing to retain the first and second fluid control devices, wherein the housing of the reset apparatus comprises a first visual indicator that corresponds to a pressure of the upstream fluid, a second visual indicator that corresponds to a pressure of the downstream fluid, a third visual indicator that corresponds to a position of the first fluid control device and a fourth visual indicator that corresponds to a position of the second fluid control device.

* * * * *